(12) United States Patent
Kagami

(10) Patent No.: US 10,732,734 B2
(45) Date of Patent: Aug. 4, 2020

(54) TRANSMITTING TYPE ELECTRONIC PEN AND SIGNAL TRANSMITTING CIRCUIT THEREOF

(71) Applicant: Wacom Co., Ltd., Saitama (JP)

(72) Inventor: Tomohiro Kagami, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/208,179

(22) Filed: Dec. 3, 2018

(65) Prior Publication Data

US 2019/0101995 A1    Apr. 4, 2019

Related U.S. Application Data

(63) Continuation of application No. PCT/JP2016/068771, filed on Jun. 24, 2016.

(51) Int. Cl.
    *G06F 3/0354* (2013.01)
    *G06F 3/044* (2006.01)
    (Continued)

(52) U.S. Cl.
    CPC ........ *G06F 3/03545* (2013.01); *G06F 3/0383* (2013.01); *G06F 3/044* (2013.01); *G06F 3/0412* (2013.01); *H01F 27/28* (2013.01)

(58) Field of Classification Search
    CPC .... G06F 3/03545; G06F 3/038; G06F 3/0383; G06F 3/0386; G06F 3/0412; G06F 3/044; H01F 27/28
    See application file for complete search history.

(56) References Cited

U.S. PATENT DOCUMENTS

| 5,629,500 A * | 5/1997 | Fukuzaki | G06F 3/03545 |
| | | | 178/19.07 |
| 2007/0018618 A1 * | 1/2007 | Endo | H02M 3/1588 |
| | | | 323/224 |

(Continued)

FOREIGN PATENT DOCUMENTS

JP    5687398 B1    3/2015

OTHER PUBLICATIONS

International Search Report for PCT/JP2016/068771, dated Aug. 29, 2016, 2 pages.

*Primary Examiner* — Tom V Sheng
(74) *Attorney, Agent, or Firm* — Seed IP Law Group LLP

(57) ABSTRACT

A signal transmitting circuit prevents oscillation efficiency from dropping regardless of changes in transmission signal frequency. The signal transmitting circuit includes a switch circuit that enables a current to flow to a resonance circuit including a capacitor and a coil to provide energy that sustains resonance of the resonance circuit, and a control signal generating circuit that generates a control signal to control changeover of the switch circuit, thereby outputting a transmission signal having a resonance frequency of the resonance circuit. The control signal generating circuit includes a detection circuit that detects a cycle of the transmission signal, a timing generating circuit that generates a timing point at which the changeover control signal is generated based on a detection result of the detection circuit, and a drive circuit that generates the control signal at the timing point generated by the timing generating circuit to control changeover of the switch circuit.

14 Claims, 9 Drawing Sheets

(51) Int. Cl.
*G06F 3/038* (2013.01)
*G06F 3/041* (2006.01)
*H01F 27/28* (2006.01)

(56) References Cited

U.S. PATENT DOCUMENTS

| | | | |
|---|---|---|---|
| 2008/0099254 A1* | 5/2008 | Katsurahira | G06F 3/03545 178/18.01 |
| 2014/0183965 A1* | 7/2014 | Okazaki | H02J 7/025 307/104 |
| 2017/0090599 A1* | 3/2017 | Kuboyama | G06F 3/038 |
| 2017/0185173 A1* | 6/2017 | Ito | G06F 3/046 |
| 2018/0181223 A1* | 6/2018 | Yamada | G06F 3/03545 |

* cited by examiner

F I G. 1 0 A (Prior Art)
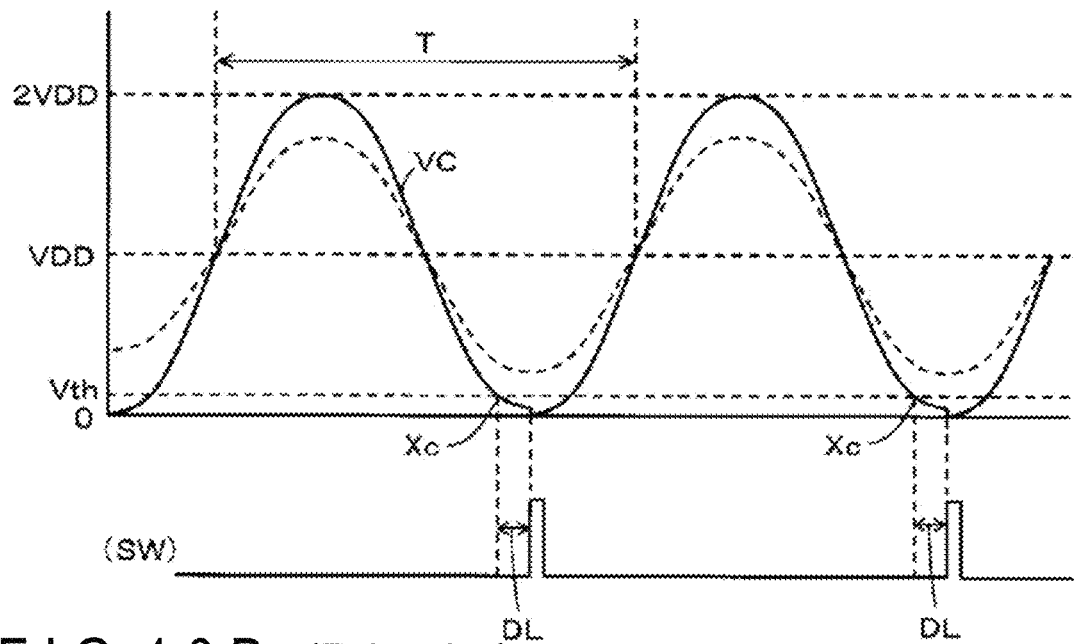
F I G. 1 0 B (Prior Art)
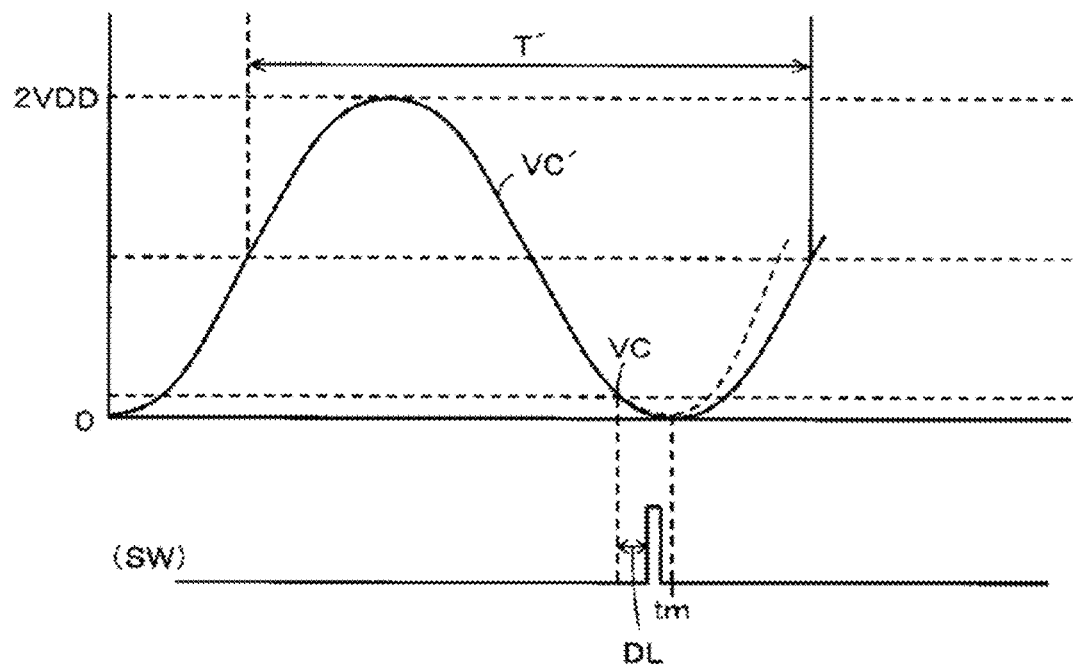

TRANSMITTING TYPE ELECTRONIC PEN AND SIGNAL TRANSMITTING CIRCUIT THEREOF

BACKGROUND

Technical Field

The present disclosure relates to a signal transmitting circuit that is included in a transmitting type electronic pen and transmits signals to a position detecting apparatus, and to a transmitting type electronic pen that includes the signal transmitting circuit.

Background Art

While there exist a variety of electronic pens (stylus pens) for a tablet that operate by diverse methods such as electronic induction and capacitive coupling, a transmitting type electronic pen is offered which, by transmitting a signal to a position detecting apparatus, enables highly accurate position indication with relative ease. In recent years, there has appeared another variation of transmitting type electronic pen operating by so-called active electrostatic coupling. The active electrostatic coupling type electronic pen incorporates a power supply circuit that uses a primary or a secondary battery and a signal transmitting circuit. This electronic pen has its stylus made of a conductor that allows the signal from the signal transmitting circuit to be transmitted to the tablet by capacitive coupling (e.g., Japanese Patent No. 5687398).

The above-mentioned active capacitive coupling type electronic pen uses the primary or secondary battery as its power supply. The transmitted signal may have any one of diverse waveforms. Typically, the signal may be transmitted on sine waves or rectangular waves.

In the case of the transmitting type electronic pen sending a rectangular wave signal to the tablet as a digital binary signal for example, there is an advantage of the signal transmitting circuit being simply configured. However, there exists the disadvantage of a significant power loss due to stray capacitance leading to a shorter battery life.

On the other hand, in the case of the transmitting type electronic pen adopting a sine wave signal as its transmission signal, the signal transmitting circuit is configured using a resonance type oscillation circuit that employs an LC resonance circuit formed by a coil and a capacitor. In this configuration, the resonance capacitor in the resonance circuit can absorb the effect of stray capacitance. This reduces power loss, thereby improving energy efficiency and prolonging the battery life. Where the battery life is taken into account, the transmitting electronic pen is preferably of the type that outputs a sine wave signal in an energy-efficient manner.

Meanwhile, there may be adopted a resonance type oscillation circuit for use with the signal transmitting circuit, the resonance type oscillation circuit being configured to generate the sine wave signal stably without attenuation, as will be explained below.

FIG. 9 is a circuit diagram for explaining key components of a signal generating circuit that uses the above-mentioned resonance type oscillation circuit. FIGS. 10A and 10B are explanatory of the operation of the resonance type oscillation circuit.

In the circuit example of FIG. 9, a resonance capacitor 2 is connected in parallel with a coil 1 to form an LC resonance circuit 3. One terminal of the LC resonance circuit 3 is connected with the supply terminal of a power supply voltage VDD. The other terminal of the LC resonance circuit 3 is grounded via a switch circuit 4. The switch circuit 4 is configured to let a current flow as the energy for sustained resonance in the LC resonance circuit 3. In the circuit example of FIG. 9, the switch circuit 4 is made of a field-effect transistor (FET). Also in the circuit example of FIG. 9, the LC resonance circuit 3, switch circuit 4, and an oscillation control signal generating circuit 5 make up a resonance type oscillation circuit 6.

The switch circuit 4 is operated by a switching control signal SW from the oscillation control signal generating circuit 5. The oscillation control signal generating circuit 5 is supplied with a sine wave voltage VC appearing at a connecting point P1 between the resonance circuit 3 and the switch circuit 4. Given the sine wave voltage VC, the oscillation control signal generating circuit 5 generates the switching control signal SW.

In the circuit example of FIG. 9, the oscillation control signal generating circuit 5 is constituted by a threshold voltage detecting circuit 51 and a drive pulse generating circuit 52.

The LC resonance circuit 3 provides at the connecting point P1 the sine wave voltage VC at a resonance frequency (cycle T) of the LC resonance circuit 3, the mean level and amplitude of the sine wave voltage VC being indicated by VDD in the upper portion of FIG. 10A. The sine wave voltage VC occurring at the connecting point P1 is supplied to the threshold voltage detecting circuit 51 as its input signal.

The threshold voltage detecting circuit 51 detects a time point Xc at which the sine wave voltage VC drops to its lowest level (0 level in FIGS. 10A and 10B) or to a threshold voltage Vth slightly higher than the lowest level. The threshold voltage detecting circuit 51 then supplies the drive pulse generating circuit 52 with a timing signal indicative of the detected time point Xc.

On the basis of the timing signal from the threshold voltage detecting circuit 51, the drive pulse generating circuit 52 generates a switching control signal SW (see the lower portion of FIG. 10A) with a predetermined short pulse width when the sine wave voltage VC reaches its lowest level (0 volts) past the time point Xc. The drive pulse generating circuit 52 supplies the generated switching control signal SW to the switch circuit 4.

In this case, when the threshold voltage Vth detected by the threshold voltage detecting circuit 51 is slightly higher than the lowest level (0 volts) as depicted in the upper portion of FIG. 10A, the drive pulse generating circuit 52 generates the switching control signal SW at a time point delayed by a fixed delay amount DL past the time point Xc. The delay amount DL is determined from the cycle T of a resonance frequency signal of the LC resonance circuit 3.

Upon receipt of the switching control signal SW, the switch circuit 4 is turned on during the pulse width period of the signal SW and turned off during periods other than the pulse width period. When the switch circuit 4 is turned on during the pulse width period of the switching signal SW, the LC resonance circuit 3 is energized with a current flowing from the power supply terminal bearing the power supply voltage VDD and through the coil 1 and capacitor 2 constituting the LC resonance circuit 3 and the switch circuit 4. In turn, the LC resonance circuit 3 formed by the coil 1 and capacitor 2 continuously generates the sine wave voltage VC at a resonance frequency without attenuation. In this case, the time point at which the sine wave voltage VC reaches its lowest level (0 volts) is the optimal timing for turning on the switch circuit 4.

In the electronic pen operating by active capacitive coupling, the coil 1, for example, is the primary winding of a transformer not depicted in FIG. 9. A sine wave signal occurring on the secondary winding of the transformer is supplied to the stylus of the electronic pen formed by the conductor.

Meanwhile, in the above-described resonance type oscillation circuit 6, the sine wave voltage VC is the supply voltage VDD at its mean level. The problem is that in the initial state of oscillation in which the amplitude is small (see the sine waveform indicated by broken line in the upper portion of FIG. 10A), the sine wave voltage VC does not drop below the threshold voltage Vth, so that the switch circuit 4 is not turned on to feed energy to sustain the oscillation. Similar problems may occur when the amplitude of the sine wave voltage VC becomes abruptly small.

Furthermore, the LC resonance circuit 3 resonates on the capacitance of the resonance capacitor 2 accompanied by ambient stray capacitance. The stray capacitance causes the resonance frequency of the LC resonance circuit 3 to fluctuate. That is, when the electronic pen is brought close to the position detecting apparatus, the stray capacitance stemming from capacitive coupling between the electronic pen and the position detecting apparatus causes the resonance frequency of the LC resonance circuit 3 to fluctuate.

In the case where the resonance frequency of the LC resonance circuit 3 is changed by stray capacitance so that one cycle of the sine wave voltage VC appearing at the connecting point Pb becomes T'($\neq$T), as depicted in the upper portion of FIG. 10B, the circuit example of FIG. 9 fails to follow the cycle (frequency) change because the timing generated by the switching control signal SW at the time point Xc at which the threshold voltage Vth is reached remains constant. The timing thus fails to synchronize with a timing tm (see the lower portion of FIG. 10B) at which the sine wave voltage VC' reaches its lowest level (0 volts).

For this reason, the efficiency of oscillation of the resonance type oscillation circuit 6 can deteriorate. It is also feared that the frequency of the sine wave signal might be affected. That is, in the case where the timing at which the switching control signal SW is generated fails to synchronize with the optimal timing, the sine wave voltage VC' generated by the resonance type oscillation circuit 6 takes on a waveform indicated by broken line in the lower portion of FIG. 10B, the frequency of the sine wave voltage VC' being thereby affected.

BRIEF SUMMARY

It is therefore an object of the present disclosure to provide a signal transmitting circuit used with a transmitting type electronic pen and capable of overcoming the above-described drawbacks and deficiencies.

In solving the above problems and according to one aspect of the present disclosure, there is provided a signal transmitting circuit for an electronic pen, including: a resonance circuit including a coil and a resonance capacitor; a switch circuit which, in operation, enables a current to flow to the resonance circuit, the current providing to the resonance circuit energy that sustains resonance of the resonance circuit; and a control signal generating circuit which, in operation, generates a control signal that controls changeover of the switch circuit to enable the current to flow to the resonance circuit.

A transmission signal with a resonance frequency of the resonance circuit is output from the electronic pen.

The control signal generating circuit includes: a detection circuit which, in operation, detects a cycle of the transmission signal; a timing generating circuit which, in operation, generates a timing point at which the control signal is generated based on a result of a detection by the detection circuit; and a drive circuit which, in operation, generates the control signal at a timing generated by the timing point generating circuit and supplies the generated control signal to the switch circuit.

In the signal transmitting circuit for the electronic pen according to one aspect of this disclosure, the control signal generating circuit has the detection circuit that detects the cycle of the transmission signal having the resonance frequency of the resonance circuit. The timing generating circuit in the control signal generating circuit generates the timing point at which the control signal is generated based on the result of the detection by the detection circuit. The drive circuit generates the control signal at the generated timing point.

Thus the control signal for the switch circuit becomes a suitably timed signal that follows frequency changes occurring in the resonance frequency of the resonance circuit in a manner reflecting capacitance including stray capacitance. This keeps the oscillation efficiency of the oscillation circuit including the resonance circuit from deteriorating and prevents the frequency of the transmission signal from being affected.

According to the present disclosure, the control signal for the switch circuit that enables the current to flow to the resonance circuit and provide energy that sustains resonance of the resonance circuit is a suitably timed signal following frequency changes that may appear in the resonance frequency of the resonance circuit in a manner reflecting capacitance including stray capacitance. This makes it possible to keep the oscillation efficiency of an oscillation circuit including the resonance circuit from deteriorating and to prevent the frequency of the transmission signal from being affected.

BRIEF DESCRIPTION OF THE DRAWINGS

FIGS. 10A and 10B are timing charts explanatory of the operations of the signal transmitting circuit which is used by the transmitting type electronic pen and of which the typical circuit is depicted in FIG. 9.

DETAILED DESCRIPTION OF THE PREFERRED EMBODIMENTS

A signal transmitting circuit used by an electronic pen according to an embodiment of the present disclosure is described blow with reference to the accompanying drawings. The ensuing description is preceded by an explanation of a typical configuration of a transmitting type electronic pen to which this disclosure is applied and a position detecting apparatus for use with the transmitting type electronic pen.

Figure 1:
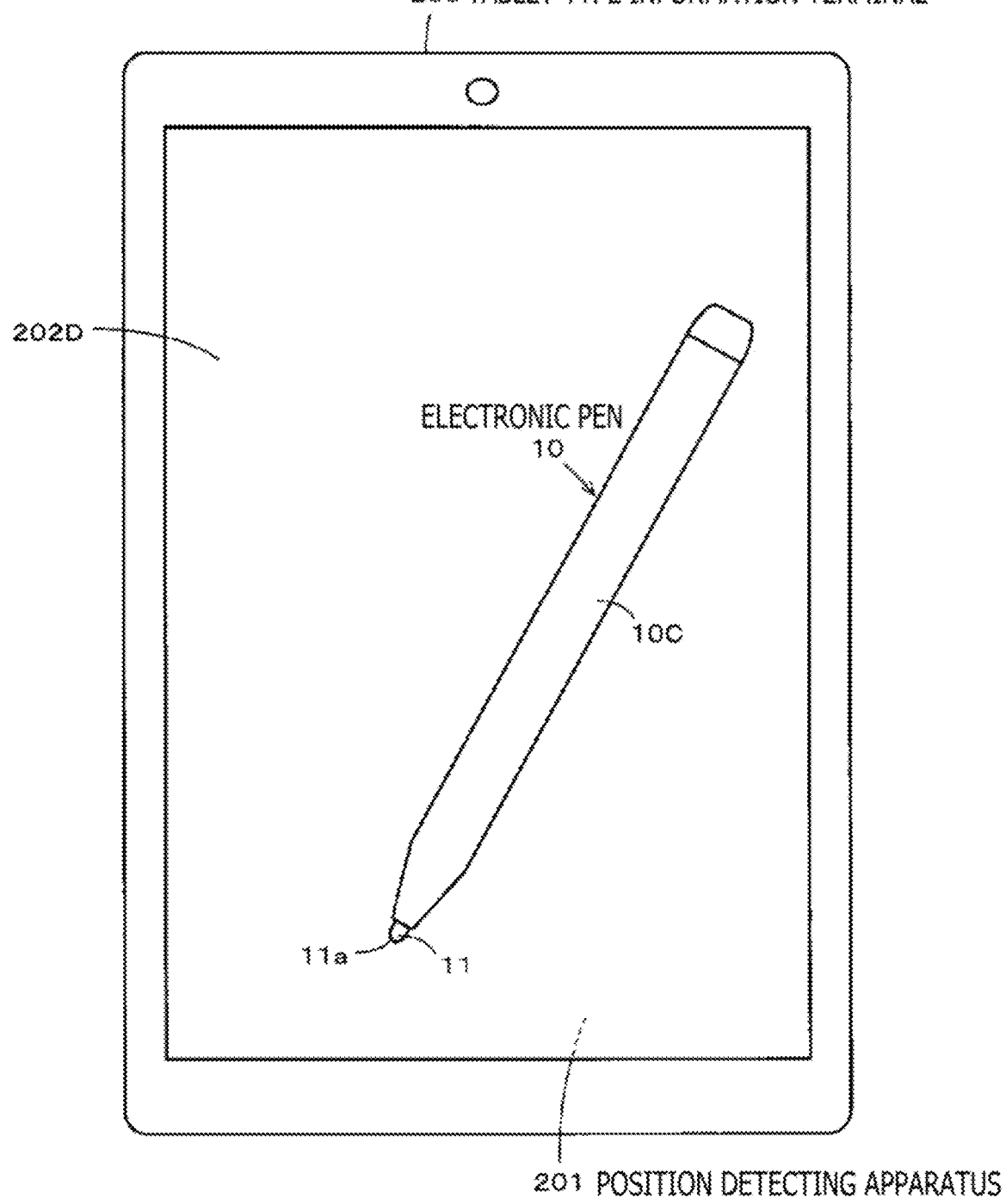
FIG. 1 is a schematic diagram explanatory of a typical electronic device furnished with a transmitting type electronic pen according to the present disclosure and a position detecting apparatus.

FIG. 1 depicts a typical electronic pen 10 to which the present disclosure is applied and a tablet type information terminal 200 as a typical position detecting apparatus. In this example, the tablet type information terminal 200 is equipped with a display apparatus in the form of a liquid crystal display (LCD). The upper side (surface side) of a display screen 202D of this display apparatus is furnished with a position detecting apparatus 201 that includes transparent position detecting sensors operating by capacitive coupling. The tablet type information terminal 200 is equipped with the electronic pen 10 that indicates positions by capacitive coupling on the position detecting sensors of the position detecting apparatus 201.

The electronic pen 10 has a cylindrical housing 10C that holds a printed-circuit board in its hollow interior, not illustrated. The printed-circuit board includes a signal transmitting circuit, to be discussed later. A transmission signal generated by this signal transmitting circuit is output via a stylus 11 made of an electrically conducting material.

A user of the electronic pen 10 brings a tip part (pen tip) 11a of the stylus 11 close to the position detecting sensors of the position detecting apparatus 201, or into contact with the position detecting sensors while applying an appropriate writing pressure to the pen tip 11a. In this state, the user performs drawing input operations such as drawing a line or a character. Given the signal from the electronic pen 10, the position detecting apparatus 201 detects the drawing input made by the electronic pen 10 and also detects the writing pressure of the electronic pen 10 at the time of the drawing input.

Explained next is a typical configuration of the position detecting apparatus 201 of the tablet type information terminal 200 used in conjunction with the electronic pen 10 of this embodiment.

Figure 2:
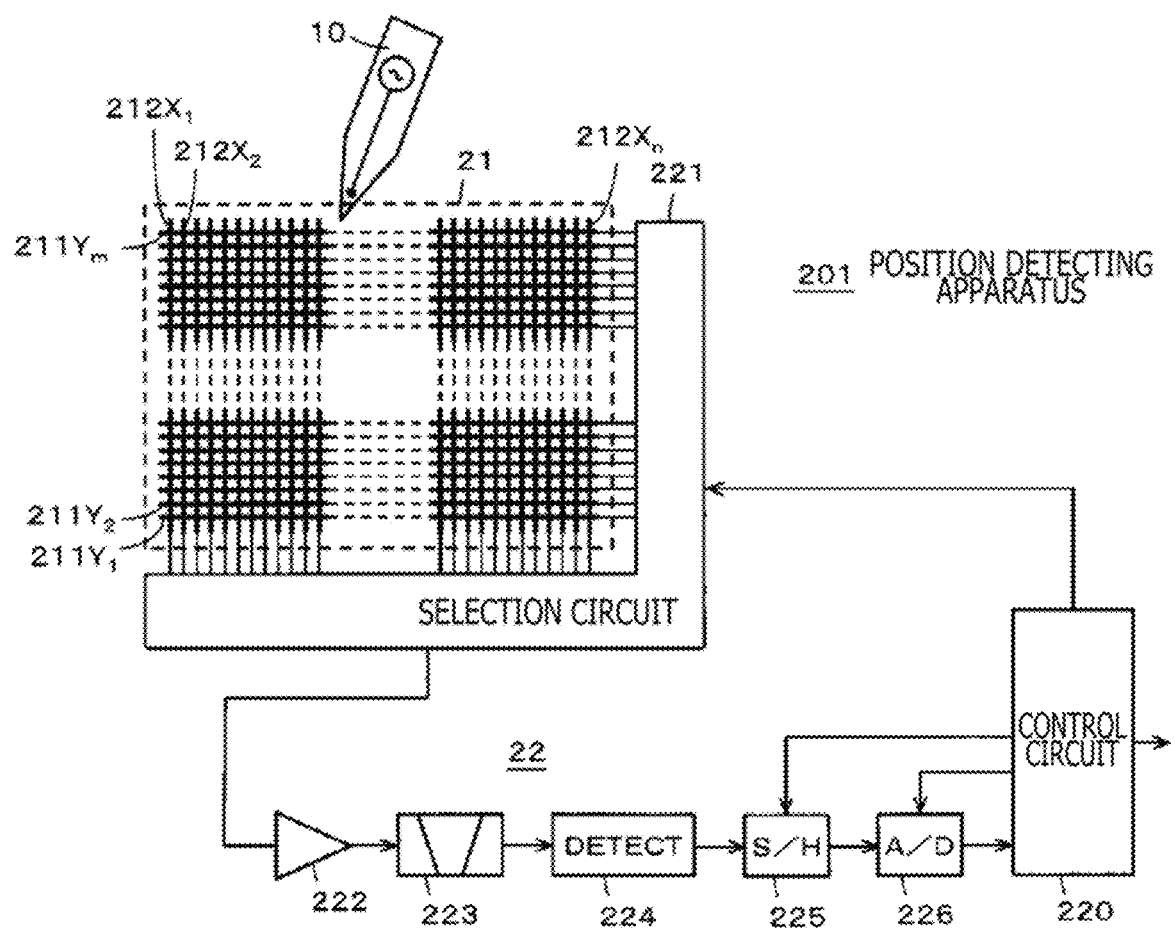
FIG. 2 is a schematic diagram explanatory of a typical position detecting apparatus for use with the transmitting type electronic pen according to the present disclosure.

FIG. 2 depicts a typical circuit of key components in the position detecting apparatus 201. Using a sine wave signal at a predetermined frequency, the electronic pen 10 outputs a position detecting signal, writing pressure information and side switch information typical of important additional information regarding the electronic pen 10, and identification information (for identifying the electronic pen 10) to the tablet type information terminal 200 through the stylus 11 made of an electrically conducting material. As illustrated in FIG. 2, the position detecting apparatus 201 of the tablet type information terminal 200 includes a position detecting sensor part 21 and a pen indication detecting circuit 22.

The position detecting sensor part 21 has a first conductor group 211, an insulation layer (not illustrated), and a second conductor group 212 stacked from the bottom up in that order. The first conductor group 211 has multiple first conductors $211Y_1, 211Y_2, \ldots, 211Y_m$ (m is an integer of at least 1) extended crosswise (in the X axis direction), arranged in parallel a predetermined distance apart from each other, and arrayed in the Y axis direction.

The second conductor group 212 has multiple second conductors $212X_1, 212X_2, \ldots, 212X_n$ (n is an integer of at least 1) extended perpendicular to the direction in which the first conductors $211Y_1, 211Y_2, \ldots, 211Y_m$ are extended, i.e., in the lengthwise direction (Y axis direction) in this example, arranged in parallel a predetermined distance apart from each other, and arrayed in the X axis direction.

In the description that follows, the first conductors $211Y_1, 211Y_2, \ldots, 211Y_m$ may be generically referred to as the first conductors 211Y where there is no need to distinguish one first conductor from another. Likewise, the second conductors $212X_1, 212X_2, \ldots, 212X_n$ may be generically referred to as the second conductors 212X where there is no need to distinguish one second conductor from another.

A selection circuit 221 acting as an input/output interface is interposed between the position detecting sensor part 21 and a control circuit 220 in the pen indication detecting circuit 22. The selection circuit 221 is controlled to select one conductor from the first conductor group 211Y and one conductor from the second conductor group 212X on the basis of a control signal from the control circuit 220.

The pen indication detecting circuit 22 is made up of an amplification circuit 222 connected with the selection circuit 221, a band-pass filter 223, a detection circuit 224, a sample hold circuit 225, an analog-to-digital (AD) conversion circuit 226, and the control circuit 220.

The pen indication detecting circuit 22 receives input from those conductors in the position detecting sensor part 21 which are selected by the selection circuit 221 based on the control signal from the control circuit 220. In the pen indication detecting circuit 22, the amplification circuit 222 amplifies a transmission signal formed by a modulated sine wave signal from the electronic pen 10. The output of the amplification circuit 222 is supplied to the band-pass filter 223 where only the frequency component of the sine wave signal is extracted.

The detection circuit 224 detects the output signal of the band-pass filter 223. The output signal of the detection circuit 224 is supplied to the sample hold circuit 225 that executes a sample hold operation on the signal at a suitable timing based on a sampling signal from the control circuit 220. Then the output signal of the sample hold circuit 225 is converted to digital data by the AD conversion circuit 226. The digital data from the AD conversion circuit 226 is read and processed by the control circuit 220.

Using programs stored in an internal read only memory (ROM), the control circuit 220 works to output control signals individually to the sample hold circuit 225, to the AD conversion circuit 226, and to the selection circuit 221. Also, the control circuit 220 calculates those position coordinates on the position detecting sensor part 21 which are indicated by the electronic pen 10 on the basis of the digital data from the AD conversion circuit 226.

In this example, the electronic pen 10 is configured to output to the tablet type information terminal 200 a sine wave signal modulated not only by the position detecting signal but also by the transmission data including such additional information as writing pressure information and side switch information, as described above. Incidentally, a writing pressure detecting mechanism and a side switch information generating mechanism of the electronic pen 10 may be any suitable existing mechanisms and thus will not be discussed further.

Figure 3:
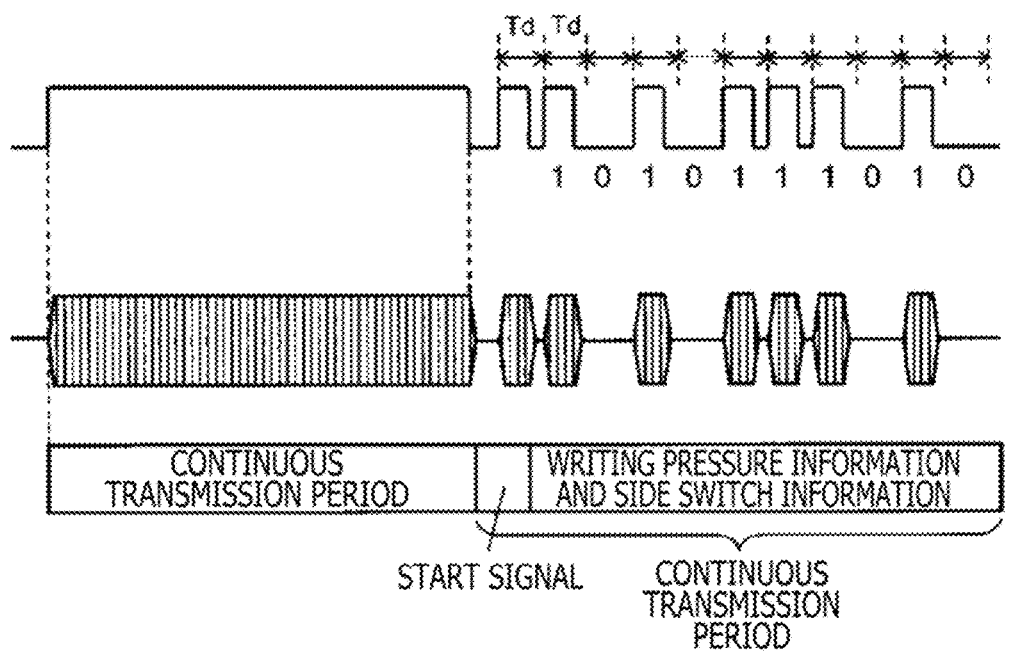
FIG. 3 is a schematic diagram explanatory of typical signals output from the transmitting type electronic pen according to an embodiment of the present disclosure.

The upper portion of FIG. 3 depicts typical transmission data transmitted from the electronic pen 10. As illustrated in the middle and lower portions of FIG. 3, the signal sent from the electronic pen 10 (sine wave signal Ss) has a pattern in which a continuous transmission period and a transmission data period are repeated in cycles in this example. That is, the signal output from the electronic pen 10 has a predetermined continuous transmission period in which the digital signal representing the transmission data depicted in the upper portion of FIG. 3 is held continuously High. This period (continuous transmission period in the lower portion of FIG. 3) is a state in which the sine wave signal continues as a burst signal as illustrated in the middle portion of FIG. 3.

The continuous transmission period is arranged to be long enough for the pen indication detecting circuit 22 in the position detecting apparatus 201 to detect that position on the position detecting sensor part 21 which is indicated by the electronic pen 10. For example, the continuous transmission period is long enough to let all of the first conductors 211Y and the second conductors 212X be scanned at least once and preferably multiple times.

At the end of the continuous transmission period, the electronic pen 10 transmits from the stylus 11 the transmission data including the writing pressure information as a multiple-bit value (in binary code) representing the writing pressure applied to the electronic pen 10, one-bit or multiple-bit side switch information indicative of the on-off states of side switches, and identification information.

That is, as depicted in the upper portion of FIG. 3, the electronic pen 10 generates as the transmission signal the sine wave signal modulated by amplitude shift keying (ASK) or by on-off keying (OOK) using the transmission data going High or Low in a predetermined cycle (Td) during the transmission data period at the end of the continuous transmission period. As illustrated in the upper and middle portions of FIG. 3, the ASK-modulated or OOK-modulated signal is generated in such a manner that the sine wave signal is controlled to be not output when the transmission data (in binary code) is "0" and controlled to be output when the transmission data (in binary code) is "1."

At this time, a first predetermined cycle (Td) following the continuous transmission period is always at the High level, which is taken as a start signal depicted in the lower portion of FIG. 3. The start signal serves as the timing signal that allows the control circuit 220 in the pen indication detecting circuit 22 of the position detecting apparatus 201 to determine accurately the timing for outputting subsequent transmission data. Alternatively, the start signal as the timing signal may be replaced with the sine wave signal acting as the burst signal during the continuous transmission period.

In the pen indication detecting circuit 22 of the position detecting apparatus 201, the control circuit 220 detects that position on the position detecting sensor part 21 which is indicated by the electronic pen 10 from the received signal of the continuous transmission period. The control circuit 220 then waits for the continuous transmission period to end. Upon detecting the start signal at the end of the continuous transmission period, the control circuit 220 detects and reconstructs the writing pressure information, side switch information, and other data including identification information over the transmission data period. The control circuit 220 then outputs to a host computer, for example, the information regarding the detected position indicated by the electronic pen 10, the writing pressure information, side switch information, and other information including the identification information.

<Typical Configuration of the Signal Transmitting Circuit Used by an Electronic Pen According to an Embodiment of the Present Disclosure>

Figure 4:
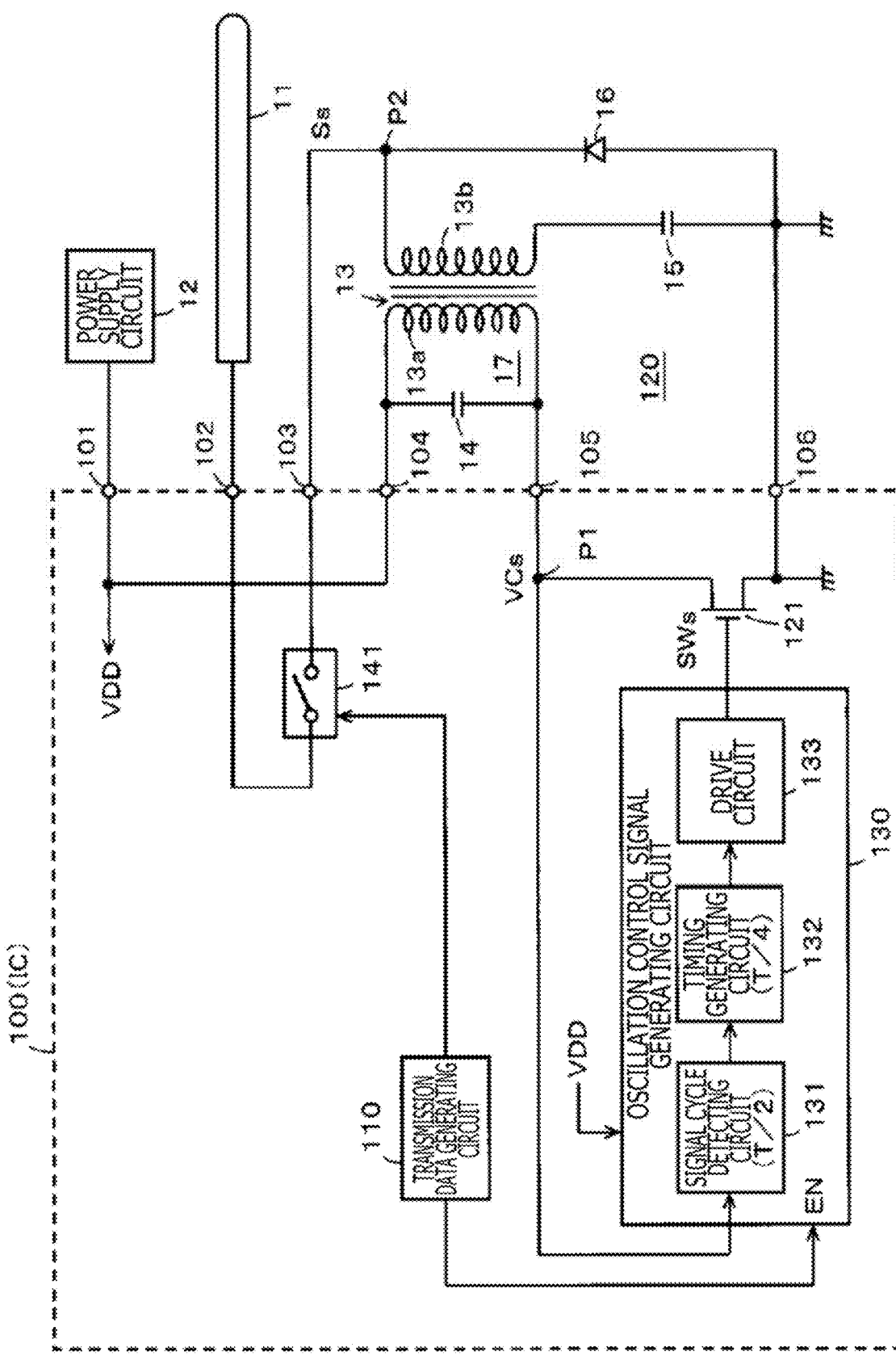
FIG. 4 is a circuit diagram of a typical signal processing circuit that includes a signal transmitting circuit used by the transmitting type electronic pen according to an embodiment of the present disclosure.

FIG. 4 depicts a typical signal processing circuit that includes a signal transmitting circuit used by the electronic pen 10 according to an embodiment of the present disclosure. The electronic pen 10 of this embodiment includes an electrically conductive stylus 11 for transmitting the sine wave signal. The stylus 11 is constituted, for example, by a conductive metal or a conductive resin material mixed with electrically conducting powder. The pen tip 11a depicted in FIG. 1 is the tip of the stylus 11.

The electronic pen 10 of this embodiment uses a power supply circuit 12 that includes a primary or a secondary battery to provide a power supply voltage VDD. A lithium ion battery, for example, may be used as the secondary battery. Alternatively, in constituting the power supply circuit 12, a power storage device such as an electric double layer capacitor or a lithium ion capacitor may be used in place of or in combination with the secondary battery. As another alternative, the power supply circuit 12 may be formed using an autonomous power generating element such as a solar cell and the power storage device such as the electric double layer capacitor or the lithium ion capacitor.

The signal processing circuit of the electronic pen 10 of this embodiment is configured with an integrated circuit (IC) 100 and its external components. The IC 100 has terminals 101 to 106. The power supply voltage VDD from the power supply circuit 12 is supplied to the IC 100 via the terminal 101.

The signal processing circuit made of the IC 100 and its external components includes a transmission data generating circuit 110, a sine wave signal generating circuit 120, and an oscillation control signal generating circuit 130.

The transmission data generating circuit 110 generates transmission data such as that depicted in the upper portion of FIG. 3 for transmission to the position detecting apparatus 201 of the tablet type information terminal 200. As described above, the transmission data includes not only the position detecting signal but also the information regarding the writing pressure detected by the writing pressure detecting mechanism (not illustrated) of the electronic pen 10, on-off information about the side switches (not illustrated) of the electronic pen 10, and the identification information identifying the electronic pen 10 and stored in a memory (not illustrated).

The sine wave signal generating circuit 120 is configured with a transformer 13, a resonance capacitor 14, a bias generating capacitor 15, and a bias generating diode 16 as the external components to the IC 100 and with a switch circuit 121 inside the IC 100. In this example, the switch circuit 121 is formed by a FET.

The transformer 13 has a primary winding 13a and a secondary winding 13b. The turn ratio of the primary winding 13a to the secondary winding 13b is 1:n (n>1; n=5 for example). The primary winding 13a of the transformer 13 is connected in parallel with the resonance capacitor 14 which, together with a coil made of the primary winding 13a, constitutes an LC resonance circuit 17. One terminal of the LC resonance circuit 17 is connected with the terminal 104 of the IC 100 at which the power supply voltage VDD appears. The other terminal of the LC resonance circuit 17 is connected via the terminal 105 to a connecting point P1 coupled with the drain of the FET constituting the switch circuit 121.

In this embodiment, the sine wave signal generating circuit 120 configures an oscillation circuit including the LC resonance circuit 17 formed by the primary winding 13a of the transformer 13 and by the resonance capacitor 14, and the switch circuit 121. That is, the sine wave signal generating circuit 120 causes the oscillation circuit to oscillate using the LC resonance circuit 17 and, at an appropriate timing, performs on-off control of the switch circuit 121 to feed energy to the resonance circuit 17. This makes it possible to sustain oscillation without attenuating the oscillation output signal (sine wave signal) of the oscillation circuit.

One terminal of the secondary winding 13b of the transformer 13 is connected with the cathode of the bias generating diode 16. The anode of the diode 16 is grounded and also connected to the terminal 106 of the IC 100. The other terminal of the secondary winding 13b of the transformer 13 is grounded via the bias generating capacitor 15 and also connected with the terminal 106 of the IC 100. One terminal of the secondary winding 13b of the transformer 13 and a connecting point P2 coupled with the cathode of the bias generating diode 16 constitute the output terminal of the sine wave signal generating circuit 120.

Figure 5A:
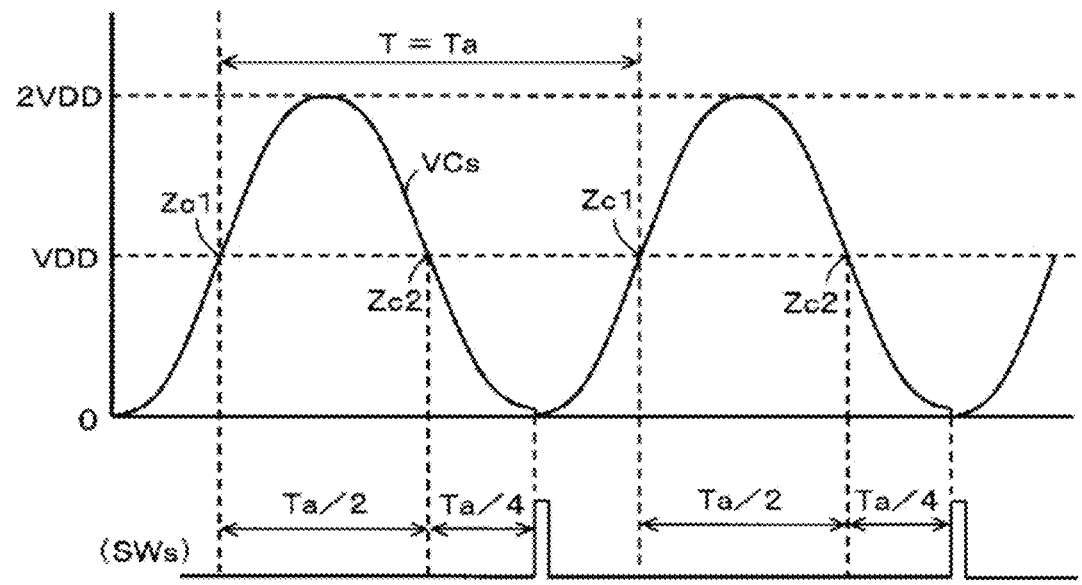
FIGS. 5A and 5B are timing charts explanatory of the signal transmitting circuit used by the transmitting type electronic pen according to an embodiment of the present disclosure.
Figure 5B:
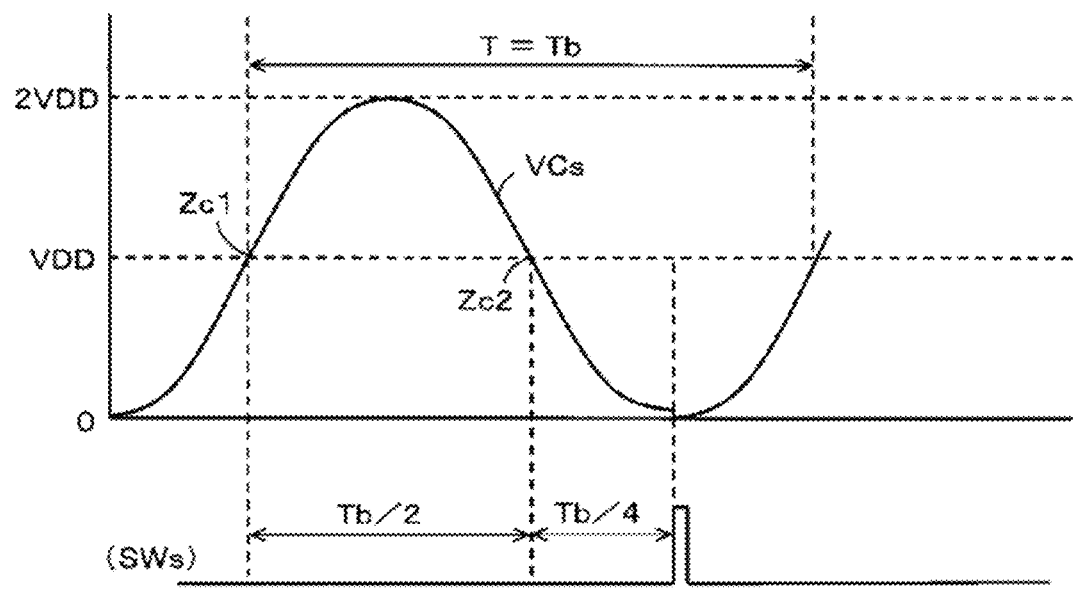

At the connecting point P1, the LC resonance circuit 17 generates, with its resonance frequency (cycle T), a sine wave voltage VCs whose mean level and amplitude are indicated by VDD, as depicted in the upper portions of FIGS. 5A and 5B. At one terminal of the secondary winding 13b of the transformer 13 and at the connecting point P2 coupled with the bias generating diode 16, a sine wave signal Ss appears whose amplitude is n times that of the sine wave voltage VCs occurring at the connecting point P1, in accordance with the turn ratio of 1:n between the primary winding 13a and the secondary winding 13b of the transformer 13.

The connecting point P2 serving as the output terminal of the sine wave signal generating circuit 120 is connected with the terminal 103 of the IC 100. The sine wave signal Ss appearing at the connecting point P2 is supplied into the IC 100 via the terminal 103. The terminal 103 is connected with one terminal of a switch circuit 141. The other terminal of the switch circuit 141 is connected with the terminal 102 of the IC 100. The terminal 102 is connected with the stylus 11, made of an electrically conducting material, of the electronic pen 10. Thus in this example, the sine wave signal Ss of the sine wave signal generating circuit 120 is supplied to the stylus 11 via the switch circuit 141 interposed between the terminals 103 and 102.

In this embodiment, on-off control of the switch circuit 121 is performed using a switching control signal SWs from the oscillation control signal generating circuit 130.

The oscillation control signal generating circuit 130 is supplied with the voltage VCs occurring at the connecting point P1 between the switch circuit 121 and the terminal 105 connected with the other terminal of the LC resonance circuit 17. By monitoring the voltage VCs at the connecting point P1, the oscillation control signal generating circuit 130 generates the switching control signal SWs for on-off control of the switch circuit 121 in such a manner that the sine wave signal generating circuit 120 acting as an oscillation circuit generates the sine wave signal Ss. A detailed configuration and processing operations of the oscillation control signal generating circuit 130 will be discussed later.

The transmission data generated by the transmission data generating circuit 110 is supplied to an operation enable control terminal EN of the oscillation control signal generating circuit 130. The transmission data is also supplied as an on-off control signal to the switch circuit 141.

That is, when the transmission data is "1" for example, the oscillation control signal generating circuit 130 is put in an operating state (enabled) and the switch circuit 141 is turned on. This causes the sine wave signal generating circuit 120 to generate the sine wave signal Ss. The sine wave signal Ss is controlled to be supplied to the stylus 11 via the switch circuit 141 and output to the position detecting apparatus 201. When the transmission data is "0," the oscillation control signal generating circuit 130 is put in a non-operating state (disabled) and the switch circuit 141 is turned off. This causes the sine wave signal generating circuit 120 to stop generating the sine wave signal Ss. The supply of the sine wave signal Ss to the stylus 11 is thus cut off by the switch circuit 141.

As described above, the sine wave signal Ss generated by the sine wave signal generating circuit 120 is supplied to the stylus 11 after being ASK- or OOK-modulated with the transmission data generated by the transmission data generating circuit 110.

<Typical Configuration and Processing Operations of the Oscillation Control Signal Generating Circuit 130>

As depicted in FIG. 4, the oscillation control signal generating circuit 130 includes a signal cycle detecting circuit 131, a timing generating circuit 132, and a drive circuit 133. The sine wave voltage VCs appearing at the connecting point P1 is input to the signal cycle detecting circuit 131.

The signal cycle detecting circuit 131, as illustrated in the upper portion of FIG. 5A, detects (measures) the time length T/2 of a ½-cycle period on the positive side of the sine wave signal where the sine wave voltage VCs is at least the voltage VDD (where T is the cycle of the sine wave voltage VCs and T=Ta for the sine wave signal VCs in the upper portion of FIG. 5A). The signal cycle detecting circuit 131 transmits the result of the detection to the timing generating circuit 132. That is, as depicted in the upper portion of FIG. 5A, the signal cycle detecting circuit 131 detects zero-cross points Zc1 and Zc2 of the sine wave voltage VCs and detects (measures) the time length between the detected zero-cross points Zc1 and Zc2, thereby finding the ½-cycle (T/2) of the sine wave voltage VCs.

On the basis of the detection result of the cycle (detection result of the ½-cycle) from the signal cycle detecting circuit 131, the timing generating circuit 132 generates a timing at the time of maximum amplitude on the negative side of the sine wave voltage VCs. In this example, the timing generating circuit 132 generates, as a timing point of maximum amplitude on the negative side of the sine wave voltage VCs, the time point at the end of the ½-cycle on the positive side of the sine wave voltage VCs depicted in the upper portion of FIG. 5A, i.e., the time point upon elapse of a ¼-cycle of the sine wave voltage VCs past the zero-cross point Zc2 (Ta/4 of the sine wave voltage VCs in the upper portion of FIG. 5A). The timing generating circuit 132 transmits the generated timing point to the drive circuit 133.

The drive circuit 133 generates the switching control signal (switching control pulse) SWs at the timing point generated by the timing generating circuit 132, and drives the switch circuit 121 using the switching control pulse SWs. The switch circuit 121 is turned on during the pulse width period of the switching control pulse SWs from the drive circuit 133. This allows a current to flow from the power supply voltage VDD via the primary winding 13a of the LC resonance circuit 17 and the switch circuit 121 so as to sustainably excite sine wave oscillation.

As described above, in the oscillation control signal generating circuit 130 of this embodiment, the signal cycle detecting circuit 131 detects the zero-cross points Zc1 and Zc2 of the sine wave voltage VCs to find the ½-cycle of the sine wave voltage VCs. In accordance with the detection result, the timing is produced to generate the switching control pulse SWs for on-off control of the switch circuit 121. Because the switching control pulse SWs is always generated regardless of the amplitude of the sine wave voltage VCs, it is possible stably to sustain the oscillation of the oscillation circuit that constitutes the sine wave signal generating circuit 120.

Also, the oscillation control signal generating circuit 130 generates the switching control pulse SWs for on-off control of the switch circuit 121 on the basis of the detection result of the cycle of the sine wave voltage VCs. Thus even if the cycle (frequency) of the sine wave voltage VCs varies with changes in the resonance frequency caused by the stray capacitance being added to the resonance capacitor 14 of the LC resonance circuit 17, the switching control pulse SWs follows the changes in the cycle (frequency).

That is, suppose that the cycle T of the sine wave voltage VCs changes from the case in the upper portion of FIG. 5A so that T=Tb as depicted in the upper portion of FIG. 5B. In that case, the signal cycle detecting circuit 131 detects Tb/2 as a ½-cycle of the sine wave voltage VCs. The timing generating circuit 132 generates the timing at the time point upon elapse of Tb/4 past the zero-cross point Zc2, which is a ¼-cycle of the sine wave voltage VCs in this case. Therefore, as illustrated in the lower portion of FIG. 5B, the switching control pulse SWs is generated at the time point of maximum amplitude on the negative side of the sine wave voltage VCs in the upper portion of FIG. 5B, the switching control pulse SWs following the cycle changes in the sine wave voltage VCs.

Thus when the electronic pen 10 brought close to the position detecting apparatus 201 triggers a cycle change (frequency change) of the sine wave signal, the on-off control timing of the switch circuit 121 is made to follow the cycle change, the switch circuit 121 feeding energy for sustained oscillation of the oscillation circuit. This keeps the efficiency of sine wave signal oscillation from dropping and prevents the frequency of the sine wave signal from being affected.

Also in the oscillation control signal generating circuit 130, the signal cycle detecting circuit 131 detects (measures) the ½-cycle time length not from the negative half-cycle period of the sine wave voltage VCs including the timing for turning on the switch circuit 121 but from the positive half-cycle period. This provides the advantage of accurately detecting (measuring) the ½-cycle of the sine wave voltage VCs and permitting highly accurate follow-up on the changes of the resonance frequency.

<Specific Circuit Example of the Oscillation Control Signal Generating Circuit 130>

Figure 6:
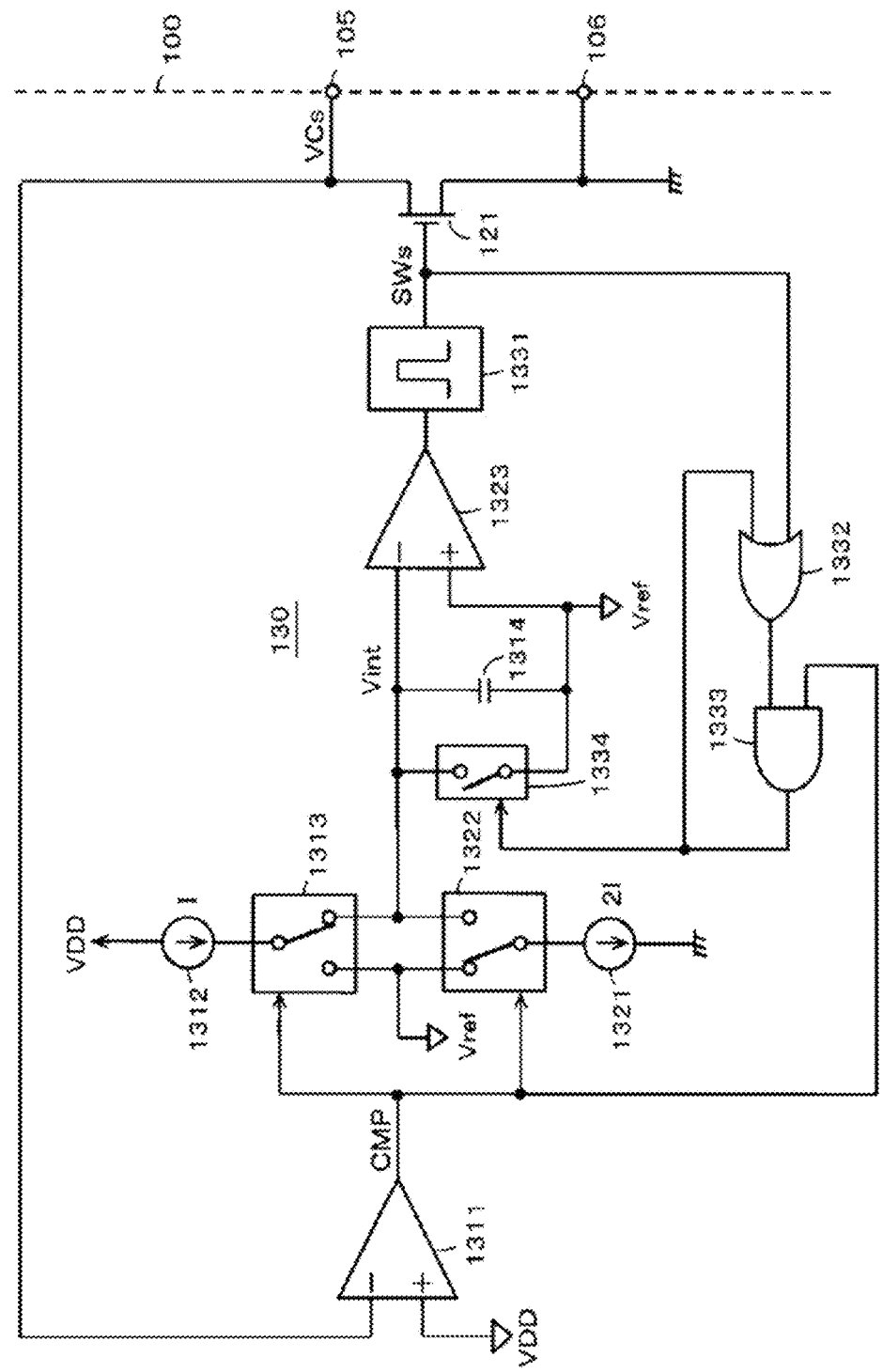
FIG. 6 is a circuit diagram depicting a specific circuit example of the signal transmitting circuit used by the transmitting type electronic pen according to an embodiment of the present disclosure.
Figure 7:
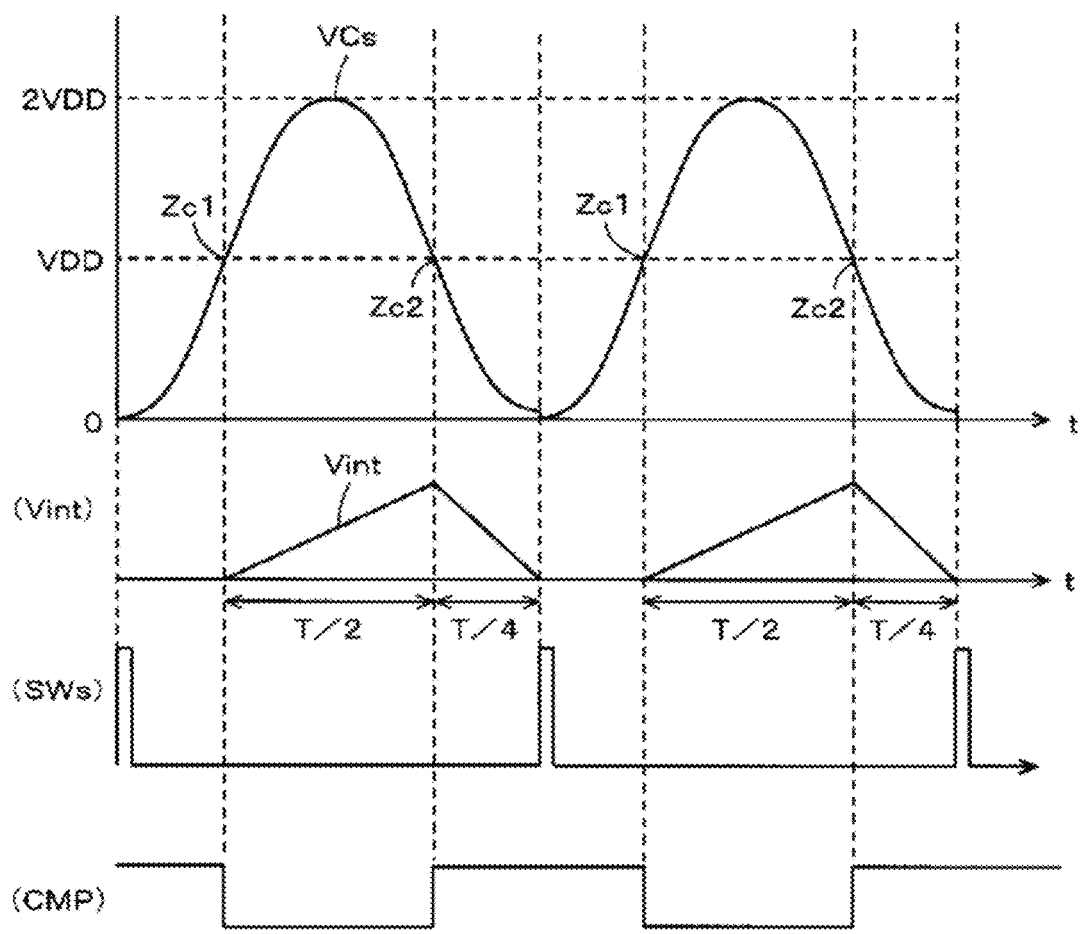
FIG. 7 is a timing chart explanatory of the operations of the embodiment depicted in FIG. 6.

FIG. 6 is a circuit diagram depicting a specific circuit example of the oscillation control signal generating circuit 130. FIG. 7 is a timing chart explanatory of the signal timings of key components in the specific circuit example of FIG. 6.

In the example of FIG. 6, the signal cycle detecting circuit 131 includes a comparison circuit 1311, a current source circuit 1312 having a current value I, a changeover switch circuit 1313, and a charging and discharging capacitor 1314.

The timing generating circuit 132 includes the comparison circuit 1311, a current source circuit 1321 having a current value 2I twice that of the current source circuit 1312, a changeover switch circuit 1322, the charging and discharging capacitor 1314, and a comparison circuit 1323. The comparison circuit 1311 and the charging and discharging capacitor 1314 are shared by the signal cycle detecting circuit 131 and by the timing generating circuit 132.

The drive circuit 133 includes a pulse generating circuit 1331 that generates the switching control pulse SWs of a predetermined short pulse width, an OR gate 1332, an AND gate 1333, a switch circuit 1334, and the comparison circuit 1311. The comparison circuit 1311 is shared by the drive circuit 133 as well.

A negative-side input terminal of the comparison circuit 1311 is supplied with the sine wave voltage VCs (see the upper portion of FIG. 7). A positive-side input terminal of the comparison circuit 1311 is supplied with the power supply voltage VDD. As depicted in the upper portion of FIG. 7, the sine wave voltage VCs has a mean voltage of VDD and an amplitude of 2VDD. Thus the comparison circuit 1311 provides an output signal CMP (see the lower portion of FIG. 7) that goes Low in the positive half-cycle period of the sine wave voltage VCs and goes High in the negative half-cycle period thereof.

The output signal CMP of the comparison circuit 1311 is supplied as a changeover control signal to the changeover switch circuits 1313 and 1322. During the positive half-cycle period of the sine wave voltage VCs in which the output signal CMP is Low, the changeover switch circuits 1313 and 1322 are controlled to enter a changeover state depicted in FIG. 6. During the negative half-cycle period of the sine wave voltage VCs in which the output signal CMP is High, the changeover switch circuits 1313 and 1322 are controlled to enter a changeover state that is opposite to the state illustrated in FIG. 6. Further, the output signal CMP of the comparison circuit 1311 is supplied to one input terminal of the AND gate 1333.

The changeover switch circuit 1313 controls charging of the charging and discharging capacitor 1314. The movable terminal of the changeover switch circuit 1313 is connected to the terminal to which the power supply voltage VDD is provided via the current source circuit 1312. One of two fixed terminals of the changeover switch circuit 1313 is connected to one terminal of the charging and discharging capacitor 1314. The other fixed terminal of the changeover switch circuit 1313 is connected to a terminal to which a reference potential Vref (e.g., VDD/2) is supplied.

The changeover switch circuit 1322 controls discharging of the charging and discharging capacitor 1314. The movable terminal of the changeover switch circuit 1322 is grounded via the current source circuit 1321. One of two fixed terminals of the changeover switch circuit 1322 is connected to one terminal of the charging and discharging capacitor 1314. The other fixed terminal of the changeover switch circuit 1322 is connected to a terminal to which the reference potential Vref is supplied.

The other terminal of the charging and discharging capacitor 1314 is grounded. The switch circuit 1334 is connected interposingly between the two terminals of the charging and discharging capacitor 1314. A voltage Vint (see FIG. 7) appearing at one terminal of the charging and discharging capacitor 1314 is supplied to the negative-side input terminal of the comparison circuit 1323. The positive-side input terminal of the comparison circuit 1323 is connected with the terminal to which the reference potential Vref is supplied. When the voltage Vint becomes zero, the comparison circuit 1323 outputs an output signal that drives the pulse generating circuit 1331.

The pulse generating circuit 1331 outputs a pulse signal of a predetermined short pulse width from the time point at which the comparison circuit 1323 outputs its output signal when the voltage Vint becomes zero. The pulse signal output from the pulse generating circuit 1331 is used as the switching control pulse SWs (see FIG. 7).

The switching control pulse SWs from the pulse generating circuit 1331 is supplied to the gate of the FET constituting the switch circuit 121. As a result, the switch circuit 121 is turned on only during the pulse width period of the switching control pulse SWs and turned off during periods other than the pulse width period.

The switching control pulse SWs from the pulse generating circuit 1331 is also supplied to one input terminal of the OR gate 1332. The output of the OR gate 1332 is supplied to the other input terminal of the AND gate 1333. The output signal of the AND gate 1333 is supplied to the switch circuit 1334 as its switch control signal and further to the other input terminal of the OR gate 1332.

The operations of the circuit in FIG. 6 configured as described above are explained below with reference to the timing chart in FIG. 7.

When the oscillation control signal generating circuit 130 is enabled, the pulse generating circuit 1331 generates the switching control pulse SWs (see FIG. 7) in accordance with the output of the comparison circuit 1323. This turns on the switch circuit 121, allowing a current to flow through the primary winding 13*a* (coil) of the LC resonance circuit 17. The oscillation circuit constituting the sine wave signal generating circuit 120 starts generating sine wave oscillation, raising the sine wave voltage VCs (see the upper portion of FIG. 7) at the connecting point P1.

When the rising sine wave voltage VCs reaches or exceeds the zero-cross point Zc1 that coincides with the power supply voltage VDD as the mean voltage of the sine wave voltage VCs, the output signal CMP (see the lower portion of FIG. 7) of the comparison circuit 1211 goes Low. This causes the changeover switch circuits 1313 and 1322 to enter the changeover state in FIG. 6. At this point, with the output signal CMP (see the lower portion of FIG. 7) of the comparison circuit 1211 going Low, the output of the AND gate 1333 goes Low. This turns off the switch circuit 1334.

Consequently, the current with the current value I from the current source circuit 1312 flows into the charging and discharging capacitor 1314 via the changeover switch circuit 1313 to charge the charging and discharging capacitor 1314. The voltage Vint (see FIG. 7) appearing at one terminal of the charging and discharging capacitor 1314 rises at a linear gradient reflecting the current value I. The charging of the charging and discharging capacitor 1314 with the current value I is continued during the ½-cycle of the sine wave voltage VCs in which the sine wave voltage VCs is at least as high as the voltage VDD. Thus the voltage Vin appearing at one terminal of the charging and discharging capacitor 1314 is increased up to a voltage value corresponding to the ½-cycle period of the sine wave voltage VCs.

In the example of FIG. 6, the signal cycle detecting circuit 131 constitutes a time integrator that temporally integrates the ½-cycle period in which the sine wave voltage VCs becomes larger than its mean level VDD.

When the sine wave voltage VCs drops below the zero-cross point Zc2 that coincides next with the power supply voltage VDD as the mean voltage, the output signal CMP (see the lower portion of FIG. 7) of the comparison circuit 1211 goes High. This brings the changeover switch circuits 1313 and 1322 into a changeover state opposite to that in FIG. 6. At this point, even with the output signal CMP (see the lower portion of FIG. 7) of the comparison circuit 1211 going High, the pulse generating circuit 1331 does not generate the switching control pule SWs. This leaves the output of the OR gate 1332 going Low. As a result, the output of the AND gate 1333 goes Low, so that the switch circuit 1334 remains off.

Then the charging and discharging capacitor 1314 stops being charged. A discharge current with the current value 2I determined by the current source circuit 1321 starts to flow from the charging and discharging capacitor 1314 through the changeover switch 1322, thereby starting the discharge. Thus the voltage Vint (see FIG. 7) appearing at one terminal of the charging and discharging capacitor 1314 drops at a linear gradient reflecting the current value 2I twice that at the time of charging. Because the discharge current value is twice the charge current value, the charging and discharging capacitor 1314 terminates its discharging with the current value 2I in a ¼-cycle of the sine wave voltage VCs, with the voltage Vint reaching zero. That is, the voltage Vint occurring at one terminal of the charging and discharging capacitor 1314 drops to zero volts upon elapse of a ¼-cycle period past the zero-cross point Zc2 of the sine wave voltage VCs, thereby terminating the discharge.

In the example of FIG. 6, the timing generating circuit 132 constitutes a time integrator that temporally integrates the ¼-cycle period past the zero-cross point Zc2 of the sine wave voltage VCs.

When the voltage Vint (see FIG. 7) appearing at one terminal of the charging and discharging capacitor 1314 becomes zero volts, the output of the comparison circuit 1323 causes the pulse generating circuit 1331 to generate the switching control pulse SWs (see FIG. 7). Thus the switch circuit 121 is controlled to be turned on during the pulse width period of the switching control pulse SWs, causing the current to flow through the LC resonance circuit 17 for sustained sine wave oscillation as discussed above.

The switching control pulse SWs generated by the pulse generating circuit 1331 is input via the OR gate 1332 to the other input terminal of the AND gate 1333. At this point, the output signal CMP (see the lower portion of FIG. 7) of the comparison circuit 1211 input to one input terminal of the AND gate 1333 goes High. Thus the switching control pulse SWs is output while being delayed via the OR gate 1332 and the AND gate 1333.

Since the output of the AND gate 1333 is fed back to the other input of the OR gate 1332, the output of the AND gate 1333 goes High as long as the output signal CMP of the comparison circuit 1311 supplied to one input terminal of the AND gate 1333 goes High. During the period in which the output of the AND gate 1333 goes High, the switch circuit 1334 is turned on. The voltage Vint (see FIG. 7) appearing in the charging and discharging capacitor 1314 remains at zero volts.

When the sine wave voltage VCs is again past the zero-cross point Zc1 where the sine wave voltage VCs exceeds the power supply voltage VDD as the mean voltage, the output signal CMP (see the lower portion of FIG. 7) of the comparison circuit 1211 goes Low. This causes the changeover circuits 1313 and 1322 to enter the changeover state in FIG. 6. The charging and discharging capacitor 1314 then starts to be charged with the current value I as discussed above. The operations described above are repeated thereafter.

As described, in the example of the oscillation control signal generating circuit 130 in FIG. 6, the time integrator using the charging and discharging circuit constitutes the signal cycle detecting circuit 131 and timing generating circuit 132. This allows the signal cycle detecting circuit 131 and the timing generating circuit 132 to be formed as discrete circuits in the IC 100. Obviously, however, the configuration of the oscillation control signal generating circuit 130 is not limited to that of the example in FIG. 6.

For example, the signal cycle detecting circuit 131 and the timing generating circuit 132 may each be configured using a counter. The pulse generating circuit for the drive circuit 133 may then be configured to generate the switching control pulse SWs on the basis of the count value of the timing generating circuit 132. That is, during the positive half-cycle period (Low level period) of the output signal CMP of the above-described comparison circuit 1311 in FIG. 6 for example, the counter constituting the signal cycle detecting circuit 131 may perform counting to detect (measure) the ½-cycle time and store the resulting count value. When the negative half-cycle period (High level period) of the output signal CMP of the comparison circuit 1311 is reached, the counter making up the timing generating circuit 132 may perform the counting. When the counter reaches a count value that corresponds to half the count value of the stored ½-cycle time, i.e., to a ¼-cycle period, the switching control pulse SWs may be generated.

In the above setup, the counter constituting the timing generating circuit 132 may be configured to count at a clock frequency twice that of the counter making up the signal cycle detecting circuit 131. This configuration allows the counter constituting the timing generating circuit 132 to generate the switching control pulse SWs when the stored count value of the ½-cycle time is reached.

An up-down counter, if adopted, may be shared by the signal cycle detecting circuit 131 and the timing generating circuit 132. In that case, during the positive half-cycle period (Low level period) of the output signal CMP of the above-described comparison circuit 1311 in FIG. 6 for example, the up-down counter may count up a clock of a predetermined frequency off. When the negative half-cycle period (High level period) of the output signal CMP of the comparison circuit 1311 is reached, the up-down counter may count down a clock of a frequency twice the above-mentioned frequency f. When the count value reaches "0," the switching control pulse SWs may be generated.

The above-described counters may be implemented as functions of a microprocessor using software.

Other Embodiments or Variations

With the above-described embodiment, the sine wave signal supplied to the stylus 11 is ASK- or OOK-modulated with the transmission data generated by the transmission data generating circuit 110. In this configuration, the switch circuit 141 is provided on a signal supply channel for the sine wave signal Ss to the stylus 11. The switch circuit 141 is controlled to be turned on and off in synchronism with the enable control (operating state control) of the oscillation control signal generating circuit 130. However, this configuration is not limitative of the present disclosure.

Figure 8:
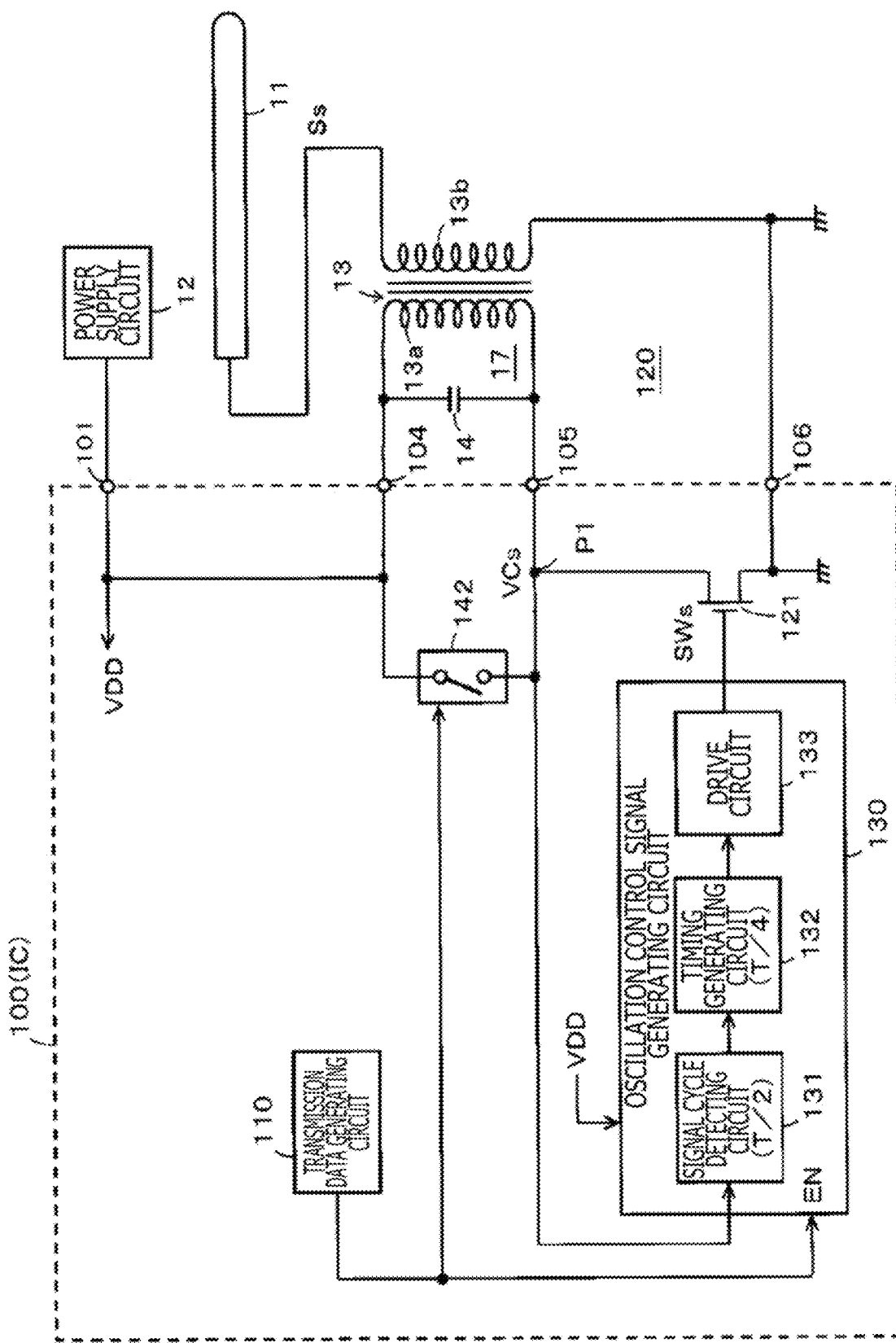
FIG. 8 is a circuit diagram depicting another typical signal processing circuit that includes the signal transmitting circuit used by the transmitting type electronic pen and according to an embodiment of the present disclosure.
Figure 9:
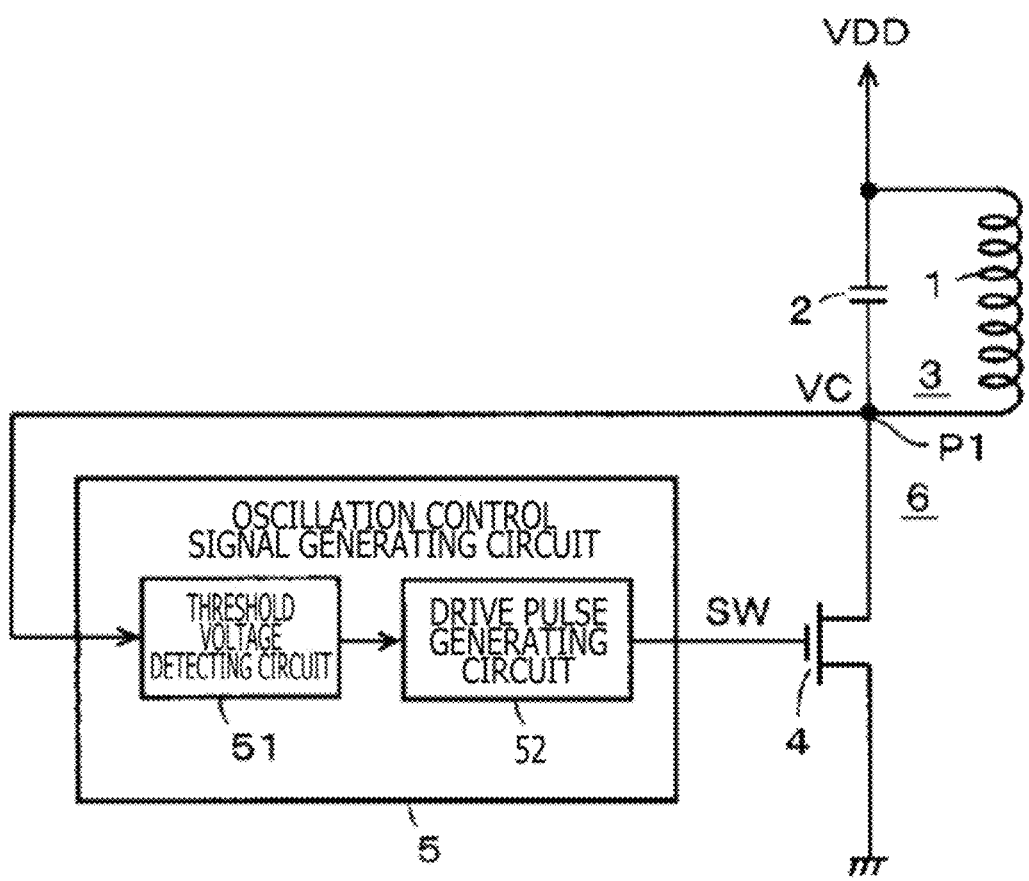
FIG. 9 is a typical circuit diagram of a signal transmitting circuit used by a transmitting type electronic pen.

FIG. 8 depicts another example of the configuration in which the sine wave signal supplied to the stylus 11 is ASK- or OOK-modulated with the transmission data generated by the transmission data generating circuit 110. In the example of FIG. 8, one terminal of the secondary winding 13b of the transformer 13, which is the output terminal of the sine wave signal generating circuit 120, is directly connected with the stylus 11. The other terminal of the secondary winding 13b is grounded.

A switch circuit 142 is connected in parallel with the primary winding 13a and the resonance capacitor 14 making up the resonance circuit 17. That is, the switch circuit 142 is interposed between the terminals 104 and 105 of the IC 100. This switch circuit 142 is controlled to be turned on and off in synchronism with the enable control of the oscillation control signal generating circuit 130 using the transmission data from the transmission data generating circuit 110. The other features of the configuration are the same as those of the circuit configuration depicted in FIG. 4.

In the circuit configuration example of FIG. 8, when the transmission data is "1" for example, the oscillation control signal generating circuit 130 is put in the operating state (enabled) and the switch circuit 141 is turned off. This puts the resonance circuit 17 in the operating state. As a result, the sine wave signal generating circuit 120 forms an oscillation circuit that includes the resonance circuit 17 and generates the sine wave signal Ss. The sine wave signal Ss is supplied to the stylus 11 via the switch circuit 141 before being output to the position detecting apparatus 201.

When the transmission data is "0," the oscillation control signal generating circuit 130 is put in the non-operating state (disabled) and the switch circuit 141 is turned on. This puts the resonance circuit 17 in the non-operating state. With the resonance circuit 17 disabled, the sine wave signal generating circuit 120 does not form an oscillation circuit and does not generate the sine wave signal Ss. Thus the stylus 11 is not supplied with the sine wave signal Ss.

Consequently, in the example of FIG. 8, the sine wave signal Ss generated by the sine wave signal generating circuit 120 is also ASK- or OOK-modulated with the transmission data generated by the transmission data generating circuit 110 before being supplied to the stylus 11.

In the example of FIG. 4, the oscillation control signal generating circuit 130 is controlled to be enabled using the transmission data from the transmission data generating circuit 110 in synchronism with the on-off control of the switch circuit 141. Alternatively, the oscillation control signal generating circuit 130 may be continuously enabled (in the operating state) without being disabled (in the non-operating state). This provides the advantage of preventing the power loss stemming from the enable control of the oscillation control signal generating circuit 130.

In the case where the oscillation control signal generating circuit 130 is always in the operating state as described above, the oscillation frequency fluctuates because the stray capacitance of the oscillation circuit constituting the sine wave signal generating circuit 120 varies with the switch circuit 141 or 142 being turned on and off in accordance with the transmission data of "1" and "0." However, in the above embodiment, the switch circuit 121 is controlled to be switched in a manner following the fluctuation of the oscillation frequency. This leaves the efficiency of oscillation undiminished.

In the above embodiment, the signal cycle detecting circuit 131 in the oscillation control signal generating circuit 130 detects the ½-cycle of the sine wave signal as discussed above. However, the cycle to be detected is not limited to the ½-period. That cycle may be a 1-cycle or a ¼-cycle, for example, as long as the detected cycle provides the basis for generating the timing at which the timing generating circuit 132 generates the switching control pulse SWs.

In the above-described embodiment, the signal processing circuit including the signal transmitting circuit for the electronic pen is made of the IC and its external components. Obviously, however, the signal transmitting circuit of the electronic pen according to the present disclosure is not limited to that configuration.

The foregoing description discussed solely the case of the electronic pen operating by capacitive coupling. However, the present disclosure applies to all signal transmitting type electron pens also operating by electromagnetic coupling or by other methods.

It is to be noted that the embodiment of the present disclosure is not limited to the foregoing embodiments, and that various changes can be made without departing from the spirit of the present disclosure.

What is claimed is:

1. A signal transmitting circuit for an electronic pen, comprising:
    a resonance circuit including a coil and a resonance capacitor;
    a switch circuit which, in operation, enables a current to flow to the resonance circuit, the current providing to the resonance circuit energy that sustains resonance of the resonance circuit; and
    a control signal generating circuit which, in operation, generates a control signal that controls changeover of the switch circuit to enable the current to flow to the resonance circuit,
    wherein a transmission signal with a resonance frequency of the resonance circuit is output from the electronic pen, and
    wherein the control signal generating circuit includes:
        a detection circuit which, in operation, detects a cycle of the transmission signal;
        a timing generating circuit which, in operation, generates a timing point at which the control signal is generated based on a result of a detection by the detection circuit; and
        a drive circuit which, in operation, generates the control signal at the timing point generated by the timing generating circuit and supplies the generated control signal to the switch circuit.

2. The signal generating circuit according to claim 1, wherein:
    the transmission signal is a sine wave signal, and
    a time at which the current is enabled to flow to the resonance circuit is a time of a maximum negative amplitude of the sine wave signal.

3. The signal generating circuit according to claim 2, wherein:
    the detection circuit detects a ½-cycle of the sine wave signal, and
    the timing generating circuit generates the time point upon elapse of a ¼-cycle of the sine wave signal from a time point at which the detection circuit stops detecting the ½-cycle.

4. The signal generating circuit according to claim 2, wherein:
    the detection circuit detects a time point at which a level of the sine wave signal is equal to a mean level thereof, thereby detecting a ½-cycle of the sine wave signal as a duration of the detected time point, and
    the timing generating circuit generates the time point upon elapse of a ¼-cycle of the sine wave signal from a time point at which a period in which the level of the sine wave signal is higher than the mean level ends.

5. The signal generating circuit according to claim 4, wherein:
    the detection circuit includes a first time integrator that temporally integrates the period in which the level of the sine wave signal is higher than the mean level, and
    the timing generating circuit includes a second time integrator that temporally integrates a half of the period temporally integrated by the first time integrator.

6. The signal generating circuit according to claim 5, wherein the first time integrator includes a charging circuit that charges a charging capacitor with a first current value, and the second time integrator includes a discharging circuit that discharges a charge voltage charged in the charging capacitor with a current value that is twice the first current value.

7. The signal generating circuit according to claim 1, wherein:
    the coil of the resonance circuit is a primary winding of a transformer, and
    the transmission signal is obtained by amplification from a secondary winding of the transformer in accordance with a winding ratio of the primary winding to the secondary winding.

8. The signal generating circuit according to claim 1, further comprising:
    a circuit which, in operation, modulates the transmission signal output from the electronic pen into an amplitude shift keying-modulated signal or an on-off keying-modulated signal.

9. The signal generating circuit according to claim 1, comprising:
    a first circuit which, in operation, modulates the transmission signal into an amplitude shift keying-modulated signal or an on-off keying-modulated signal, the first circuit including a second circuit which, in operation, performs control that puts the control signal generating circuit in an operating state or in a non-operating state.

10. The signal generating circuit according to claim 1, comprising:
    a first circuit which, in operation, modulates the transmission signal into an amplitude shift keying-modulated signal or an on-off keying-modulated signal, the first circuit including a second circuit which, in operation, controls a resonance operation of the resonance circuit.

11. The signal generating circuit according to claim 1, comprising:
    a first circuit which, in operation, modulates the transmission signal into an amplitude shift keying-modulated signal or an on-off keying-modulated signal, the first circuit including a second circuit which, in operation, controls output of the transmission signal from the electronic pen.

12. A transmitting type electronic pen comprising:
    a housing; and
    a signal transmitting circuit disposed in the housing,
    wherein the signal transmitting circuit includes:
        a resonance circuit including a coil and a resonance capacitor;
        a switch circuit which, in operation, enables a current to flow to the resonance circuit, the current providing to the resonance circuit energy that sustains resonance of the resonance circuit; and a control signal generating circuit which, in operation, generates a control signal that controls changeover of the switch circuit to enable the current to flow to the resonance circuit, wherein the control signal generating circuit includes:
a detection circuit which, in operation, detects a cycle of transmission signal;
a timing generating circuit which, in operation, generates a timing point at which the control signal is generated based on a result of a detection by the detection circuit; and
a drive circuit which, in operation, generates the control signal at a timing point generated by the timing generating circuit and supplies the generated control signal to the switch circuit; and wherein the transmission signal with a resonance frequency of the resonance circuit is output from the electronic pen.

13. The transmitting type electronic pen according to claim 12, further comprising:
an electronic pen tip made of an electronically conducting material,
wherein the transmission signal is output through the electronic pen tip.

14. The transmitting type electronic pen according to claim 12, wherein the signal transmitting circuit includes a circuit which, in operation, modulates the transmission signal with amplitude shift keying or with on-off keying in accordance with transmission data.

* * * * *